(12) United States Patent
Anand et al.

(10) Patent No.: US 12,475,154 B1
(45) Date of Patent: Nov. 18, 2025

(54) SYSTEM AND METHOD FOR ARTIFICIAL INTELLIGENCE BASED FIELD SERVICE ASSISTANCE FOR TELECOMMUNICATIONS OPERATIONS

(71) Applicants: Pawan Anand, Chester Springs, PA (US); Muthukumarapandian Chandrasekaran, Mckinney, TX (US); Veeramanikandan Chandrasekaran, Frisco, TX (US)

(72) Inventors: Pawan Anand, Chester Springs, PA (US); Muthukumarapandian Chandrasekaran, Mckinney, TX (US); Veeramanikandan Chandrasekaran, Frisco, TX (US)

( * ) Notice: Subject to any disclaimer, the term of this patent is extended or adjusted under 35 U.S.C. 154(b) by 0 days.

(21) Appl. No.: 19/258,880

(22) Filed: Jul. 2, 2025

(51) Int. Cl.
*G06F 16/30* (2019.01)
*G06F 16/334* (2025.01)
(Continued)

(52) U.S. Cl.
CPC ........ *G06F 16/3347* (2019.01); *G06F 16/345* (2019.01); *G06Q 50/50* (2024.01); *G06V 10/82* (2022.01)

(58) Field of Classification Search
CPC ... G06F 16/3347; G06F 16/345; G06Q 50/50; G06V 10/82; G06V 30/41
See application file for complete search history.

(56) References Cited

U.S. PATENT DOCUMENTS

2015/0348051 A1* 12/2015 Bodda ............... G06Q 30/016 705/304
2019/0019197 A1* 1/2019 Roberts ............. G06Q 10/067
(Continued)

FOREIGN PATENT DOCUMENTS

CN 118229267 A * 6/2024 ............. G06N 5/045
CN 119884160 A 4/2025
(Continued)

OTHER PUBLICATIONS

Fonte, Paul et al., "Empowering Field Operations with Agentic AI", Mar. 7, 2025, 15 pages, (accessible via https://www.cablelabs.com/blog/empowering-field-operations-with-agentic-ai).
(Continued)

*Primary Examiner* — Mahesh H Dwivedi
(74) *Attorney, Agent, or Firm* — FOLEY & LARDNER LLP

(57) ABSTRACT

A system and method for field service assistance for telecommunications operations are described, which utilize a data acquisition module configured to receive multimodal data inputs including structured and unstructured data from field operations. A preprocessing module normalizes the multimodal data inputs to generate pre-processed data. A vectorization module transforms the pre-processed data into numerical vector representations using domain-specific embedding models trained on telecom equipment data, implementing convolutional neural networks for image feature extraction and transformer-based encoders for text vectorization. A contextual retrieval module retrieves contextually relevant historical data from a vector database by computing similarity metrics between current job vectors and stored job completion vectors. A response generation module processes the numerical vector representations and retrieved contextual data using an evolutionary algorithm engine to generate structured job summaries and real-time field recommendations.

14 Claims, 5 Drawing Sheets

(51) Int. Cl.
*G06F 16/34* (2019.01)
*G06Q 50/50* (2024.01)
*G06V 10/82* (2022.01)

(56) References Cited

U.S. PATENT DOCUMENTS

| | | | |
|---|---|---|---|
| 2020/0076707 A1 | 3/2020 | Dukic et al. | |
| 2020/0184406 A1* | 6/2020 | Han | G06Q 10/063116 |
| 2020/0184407 A1* | 6/2020 | Mappus | G06N 20/00 |
| 2022/0038348 A1 | 2/2022 | Mayor et al. | |
| 2023/0316172 A1* | 10/2023 | Ayat | G06F 40/20 |
| | | | 705/7.13 |
| 2024/0412720 A1 | 12/2024 | Vasylyev | |

FOREIGN PATENT DOCUMENTS

| | | |
|---|---|---|
| IN | 202321027960 | 6/2023 |
| TR | 2024011546 A | 9/2024 |

OTHER PUBLICATIONS

Jain, Anil et al., "The AI-driven telecom: How we're powering transformation", MWC 2025: The AI-driven telecom, Feb. 28, 2025, 11 pages (accessible via https://cloud.google.com/blog/topics/telecommunications/the-ai-driven-telecom-how-were-powering-transformation).

Kaur, Jagreet, "Agentic AI in Telecom Industry | The Ultimate Guide", Xenonstack, Apr. 16, 2025, 27 pages (accessible via https://www.xenonstack.com/blog/agentic-ai-telecom-industry).

* cited by examiner

SYSTEM AND METHOD FOR ARTIFICIAL INTELLIGENCE BASED FIELD SERVICE ASSISTANCE FOR TELECOMMUNICATIONS OPERATIONS

TECHNICAL FIELD OF THE PRESENT DISCLOSURE

The present disclosure is directed to field service assistance systems for telecommunications operations, and more particularly to systems and methods for providing automated job summaries and real-time recommendations using autonomous agentic artificial intelligence, computer vision, and machine learning techniques for field technicians.

BACKGROUND

In the fast-paced telecommunications industry, efficiency and accuracy are paramount for field service operations. Telecom companies face mounting pressure to resolve customer issues quickly while minimizing costs. Field service operations traditionally consume a substantial portion of technicians' time on administrative tasks, with current statistics indicating that over 30% of field service time is spent on administrative tasks rather than value-adding activities. Traditionally, field technicians rely on manual processes to assess and document job details, often leading to inconsistencies, delays, and increased operational costs. A significant challenge is the time-consuming nature of summarizing job-related information, which can result in extended resolution times and reduced customer satisfaction. As a result, there is an urgent need for innovative solutions that enhance productivity and streamline workflows.

The problems associated with current field service operations are multifaceted and significantly impact operational efficiency. The reliance on manual documentation often results in inconsistencies and inaccuracies that can compromise billing integrity and performance tracking. Traditional methods can introduce inaccuracies in billing and performance tracking, leading to costly disputes and reduced customer trust. Manual processes are time-consuming, labor-intensive, and require considerable skill to achieve consistent results. The quality of the finished documentation often varies significantly based on the operator's experience and attention to detail. Field service operations constitute a major expense for telecom companies, with labor costs often representing 30-40% of total operational expenses. Moreover, the lack of real-time intelligent recommendations means technicians must rely on their experience and static procedural manuals, leading to suboptimal decision-making and extended resolution times.

Known solutions in the telecommunications field service domain include basic digital documentation tools, static knowledge bases, and traditional procedural manuals. Some automated solutions have been proposed for field service operations, including basic computer vision applications for equipment identification and simple digital work order systems. Manual job reporting systems are commonly used, where technicians fill out standardized forms and submit reports through mobile applications. Traditional computer vision applications have been employed for basic equipment identification tasks. Static knowledge bases containing equipment manuals, troubleshooting guides, and procedural documentation are widely utilized across the industry. However, these conventional approaches typically address only isolated aspects of field service operations, requiring multiple separate systems and processes to achieve comprehensive documentation and guidance.

The limitations of existing solutions are significant and hinder their effectiveness in modern telecommunications environments. Most existing solutions lack real-time intelligence and the ability to provide contextual recommendations based on current job conditions and historical data. There is no integration between different data modalities, such as text from technician reports, images from field equipment photographs, and historical job completion records. Conventional systems do not possess continuous learning and adaptation mechanisms, meaning they cannot improve their performance based on technician feedback and evolving field conditions. The absence of multimodal data processing capabilities limits the ability to provide comprehensive analysis of field situations. Furthermore, existing solutions typically require significant manual intervention and do not leverage advanced artificial intelligence techniques such as evolutionary algorithms for self-optimization. Static systems cannot adapt to changing network conditions, new equipment types, or evolving service requirements, resulting in decreased effectiveness over time.

Accordingly, there is a need for an intelligent field service assistance system that can automatically generate comprehensive job summaries, provide real-time recommendations, and continuously learn from field operations. The system should integrate multiple data modalities including text, images, and historical records to provide contextual intelligence for field technicians. There is a particular need for a system that employs autonomous agentic artificial intelligence with evolutionary optimization capabilities to continuously improve its decision-making strategies based on performance feedback and technician input. Such a system should be capable of processing multimodal data inputs, generating structured job summaries automatically, and providing real-time field recommendations while building a centralized knowledge base for continuous learning and optimization.

SUMMARY

In an aspect, a system for field service assistance for telecommunications operations is provided, comprising a data acquisition module configured to receive multimodal data inputs including structured and unstructured data from field operations, the multimodal data inputs comprising at least one of text data from technician reports, image data from field equipment photographs, and historical job completion records. The system further comprises a preprocessing module operatively coupled to the data acquisition module and configured to normalize the multimodal data inputs to generate pre-processed data. The system includes a vectorization module operatively coupled to the preprocessing module and configured to transform the pre-processed data into numerical vector representations using domain-specific embedding models trained on telecom equipment data, wherein the vectorization module implements convolutional neural networks for image feature extraction and transformer-based encoders for text vectorization. The system comprises a contextual retrieval module operatively coupled to the vectorization module and configured to retrieve contextually relevant historical data from a vector database by computing similarity metrics between current job vectors and stored job completion vectors. The system includes a response generation module operatively coupled to the contextual retrieval module and configured to process the numerical vector representations and the retrieved contextual data, using an evolutionary algorithm engine, to generate structured job summaries and real-time field recommendations. This integrated approach enables comprehensive data capture from diverse field operation sources, transforms heterogeneous data into unified numerical representations for efficient artificial intelligence processing, and generates optimized recommendations through self-improving decision strategies.

In some embodiments, the system further comprises a knowledge management module operatively coupled to the response generation module and configured to store the structured job summaries, the real-time field recommendations, and technician feedback data in a centralized knowledge base for continuous learning and optimization of the system. This centralized knowledge repository enables systematic capture and analysis of field operation outcomes, facilitating long-term performance improvements and knowledge accumulation across the telecommunications organization.

In some embodiments, the evolutionary algorithm engine is configured to evaluate system performance metrics from the knowledge management module, evolve decision-making strategies through mutation and crossover operations, and optimize action sequences based on job completion success rates and technician feedback data. This optimization approach enables the system to continuously refine its decision-making capabilities without requiring manual reprogramming or rule updates.

In some embodiments, the vectorization module comprises a computer vision processing component configured to analyze the image data from field equipment photographs using the convolutional neural networks to identify one or more of telecommunications equipment types, equipment conditions, and equipment installation configurations, and generate image feature vectors representing visual characteristics of field equipment. This visual analysis capability provides automated equipment recognition and condition assessment, reducing the need for manual equipment identification and enabling more accurate job planning.

In some embodiments, the vectorization module comprises a natural language processing component configured to process the text data from technician reports using the transformer-based encoders to extract semantic meaning from one or more of job descriptions, equipment specifications, and problem descriptions, and generate text feature vectors representing textual content semantics. This semantic understanding capability enables the system to comprehend complex technical descriptions and integrate textual information with other data modalities for comprehensive situation analysis.

In some embodiments, the response generation module is configured to generate the real-time field recommendations comprising at least one of equipment identification results, troubleshooting step sequences, required inventory specifications, and estimated completion time parameters, based on analysis of the numerical vector representations and the retrieved contextual data. This recommendation capability provides field technicians with actionable guidance covering all aspects of job execution, from equipment identification to completion time estimation.

In some embodiments, the response generation module is configured to integrate technician feedback data from the knowledge management module into the evolutionary algorithm engine to dynamically adjust recommendation accuracy and continuously improve field service guidance quality. This feedback integration mechanism ensures that the system learns from real-world field experiences and adapts its recommendations based on actual outcomes and technician preferences.

In some embodiments, the data acquisition module is further configured to receive one or more of audio data from technician voice recordings and video data from field procedure recordings as the multimodal data inputs, and the preprocessing module is configured to convert the audio data and the video data into structured formats compatible with the vectorization module. This expanded multimodal capability enables the system to process richer information sources, including verbal reports and visual procedure documentation, providing more comprehensive situational awareness.

In some embodiments, the domain-specific embedding models are trained using machine learning algorithms on at least one of telecommunications equipment images, field service documentation, and historical job completion data to optimize vector representation accuracy for telecommunications field operations. This domain-specific training approach ensures that the vector representations capture the nuances and specialized characteristics of telecommunications equipment and procedures, leading to more accurate similarity matching and contextual retrieval.

In some embodiments, the contextual retrieval module is configured to implement approximate nearest neighbor search algorithms to identify the contextually relevant historical data from the vector database and rank retrieved results based on similarity score thresholds determined by at least one of job type classification and equipment category matching. This retrieval mechanism ensures that the most relevant historical information is identified and prioritized, improving the quality of contextual information provided to the response generation module.

In an aspect, a method for providing field service assistance for telecommunications operations is provided, comprising receiving multimodal data inputs including structured and unstructured data from field operations, the multimodal data inputs comprising at least one of text data from technician reports, image data from field equipment photographs, and historical job completion records. The method includes normalizing the multimodal data inputs to generate pre-processed data. The method comprises transforming the pre-processed data into numerical vector representations using domain-specific embedding models trained on telecom equipment data, wherein transforming the pre-processed data implements convolutional neural networks for image feature extraction and transformer-based encoders for text vectorization. The method includes retrieving contextually relevant historical data from a vector database by computing similarity metrics between current job vectors and stored job completion vectors. The method comprises processing the numerical vector representations and the retrieved contextual data, using an evolutionary algorithm engine, to generate structured job summaries and real-time field recommendations. This method enables automated processing of diverse field operation data types and generation of intelligent recommendations through advanced machine learning techniques.

In some embodiments, the method further comprises storing the structured job summaries, the real-time field recommendations, and technician feedback data in a centralized knowledge base for continuous learning and optimization. This knowledge accumulation approach enables the system to build organizational memory and improve its capabilities over time through systematic learning from field operations.

In some embodiments, transforming the pre-processed data comprises analyzing the image data from field equipment photographs using the convolutional neural networks to identify one or more of telecommunications equipment types, equipment conditions, and equipment installation configurations, and generating image feature vectors representing visual characteristics of field equipment. This visual processing capability automates equipment recognition tasks and provides standardized representations of visual information for integration with other data types.

In some embodiments, processing the numerical vector representations and the retrieved contextual data comprises generating the real-time field recommendations comprising at least one of equipment identification results, troubleshooting step sequences, required inventory specifications, and estimated completion time parameters, based on analysis of the numerical vector representations and the retrieved contextual data. This recommendation generation ensures that field technicians receive complete guidance covering all aspects necessary for successful job completion.

In some embodiments, the method further comprises integrating technician feedback data from the centralized knowledge base into the evolutionary algorithm engine to dynamically adjust recommendation accuracy and continuously improve field service guidance quality. This feedback-driven improvement mechanism enables the system to evolve its capabilities based on real-world performance and technician experiences, ensuring continuous optimization of field service assistance quality.

DETAILED DESCRIPTION

In the following description, for purposes of explanation, numerous specific details are set forth in order to provide a thorough understanding of the present disclosure. It will be apparent, however, to one skilled in the art that the present disclosure is not limited to these specific details.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments.

Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Aspects of this disclosure are directed to a system for field service assistance for telecommunications operations and a method for providing field service assistance for telecommunications operations. The system and method integrate autonomous agentic artificial intelligence, computer vision, and machine learning techniques to automate job summary generation, provide real-time field recommendations, and enable continuous learning from field operations. The system employs multimodal data processing capabilities to handle diverse input types including text, images, and historical records, transforming them into unified vector representations for intelligent analysis and decision-making.

Figure 1:
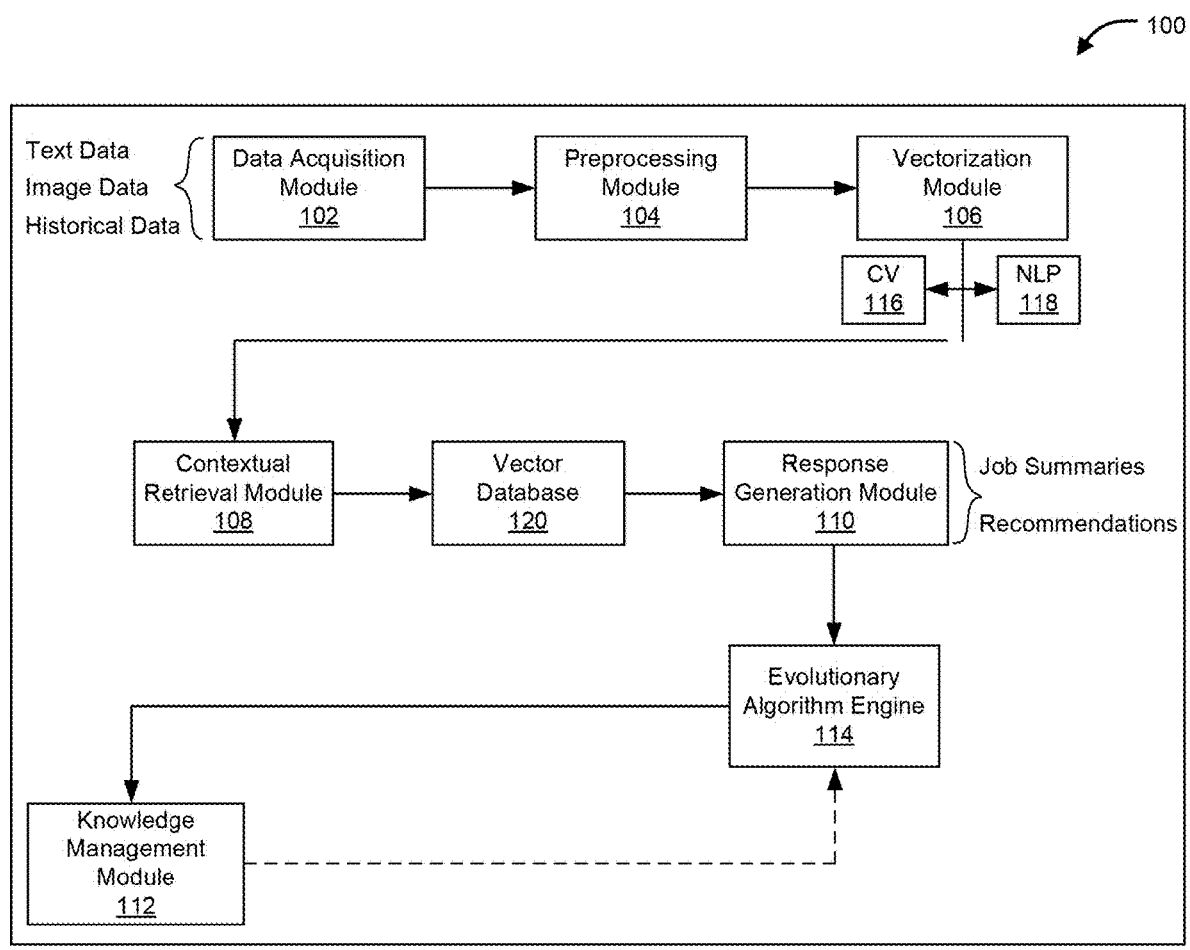
FIG. 1 is a schematic block diagram illustrating a system for field service assistance for telecommunications operations, according to certain embodiments of the present disclosure.

Referring to FIG. 1, illustrated is a schematic block diagram of a system 100 for field service assistance for telecommunications operations. The system 100 addresses the challenges faced by telecommunications field service operations by providing automated intelligence and decision support for field technicians. The system 100 integrates multiple advanced technologies including autonomous agentic artificial intelligence, computer vision, and evolutionary optimization to deliver comprehensive field service assistance capabilities. The system 100 is designed to process multimodal data inputs from field operations and generate intelligent recommendations while continuously learning and improving its performance based on feedback and outcomes.

As illustrated in FIG. 1, the system 100 comprises a data acquisition module 102 configured to receive multimodal data inputs including structured and unstructured data from field operations, the multimodal data inputs comprising at least one of text data from technician reports, image data from field equipment photographs, and historical job completion records. The data acquisition module 102 serves as the primary interface between the field operations environment and the intelligent processing capabilities of the system 100. The data acquisition module 102 is designed to handle diverse data types and formats that are commonly encountered in telecommunications field service operations. The data acquisition module 102 implements robust data ingestion pipelines that can accommodate real-time data streams as well as batch processing of historical information. The data acquisition module 102 includes specialized interfaces for receiving text data from technician reports, which may include job descriptions, problem descriptions, equipment specifications, and procedural notes entered by field technicians through mobile devices or desktop applications. The data acquisition module 102 facilitates the capture of information from multiple field operation sources, enabling the system 100 to develop a complete understanding of each field service situation.

The data acquisition module 102 is also configured to receive image data from field equipment photographs captured by technicians during their field operations. The image data includes photographs of telecommunications equipment, installation configurations, equipment conditions, and procedural documentation captured using mobile devices or specialized imaging equipment. The data acquisition module 102 implements image preprocessing capabilities to ensure that photographs are properly formatted and optimized for subsequent analysis by computer vision components. The data acquisition module 102 supports various image formats and resolutions commonly used in field operations, including JPEG, PNG, and other standard formats. The data acquisition module 102 includes metadata extraction capabilities that capture relevant information associated with each image, such as timestamp, location data, device information, and technician identification. The data acquisition module 102 ensures that image data is properly catalogued and associated with corresponding job records for comprehensive multimodal analysis.

The data acquisition module 102 is further configured to receive historical job completion records that provide contextual information for current field operations. These historical job completion records include previous job summaries, resolution procedures, equipment configurations, inventory requirements, completion times, and outcome assessments from similar field service situations. The data acquisition module 102 interfaces with existing telecommunications management systems, databases, and knowledge repositories to retrieve relevant historical information. The data acquisition module 102 implements data validation and quality assurance mechanisms to ensure that historical records are accurate, complete, and properly formatted for subsequent processing. The data acquisition module 102 supports integration with various data sources including customer relationship management systems, inventory management systems, network management platforms, and field service management applications. The data acquisition module 102 provides a unified interface for accessing diverse data sources while maintaining data integrity and security throughout the acquisition process.

The system 100 further comprises a preprocessing module 104 operatively coupled to the data acquisition module 102 and configured to normalize the multimodal data inputs to generate pre-processed data. The preprocessing module 104 receives the diverse multimodal data inputs from the data acquisition module 102 and applies standardization and normalization techniques to ensure consistent data formatting across all input types. The preprocessing module 104 implements data cleaning procedures that remove noise, correct formatting inconsistencies, and standardize data representations to facilitate efficient processing by downstream components. The preprocessing module 104 applies text normalization techniques including tokenization, spell checking, grammar correction, and standardization of technical terminology used in telecommunications field operations. The preprocessing module 104 includes image preprocessing capabilities such as resizing, brightness adjustment, contrast enhancement, and noise reduction to optimize image quality for computer vision analysis. The preprocessing module 104 ensures that all data types are converted into formats compatible with the vectorization module 106 while preserving the semantic content and technical accuracy of the original information.

In present embodiments, the preprocessing module 104 implements domain-specific preprocessing techniques tailored to telecommunications field service operations. The preprocessing module 104 applies telecommunications-specific text processing including recognition and standardization of equipment model numbers, technical abbreviations, and industry-specific terminology. The preprocessing module 104 includes specialized image preprocessing for telecommunications equipment photographs, including perspective correction, equipment isolation, and enhancement of technical details relevant to equipment identification and condition assessment. The preprocessing module 104 performs data validation and quality assessment to identify and handle missing information, incomplete records, or corrupted data elements. The preprocessing module 104 implements data augmentation techniques that can generate additional training examples for machine learning components by applying controlled variations to existing data while preserving semantic meaning.

The preprocessing module 104 further applies structured data normalization procedures for historical job completion records, ensuring consistent field naming, data type standardization, and temporal alignment across different data sources. The preprocessing module 104 implements data fusion capabilities that can combine related information from multiple sources into unified records while maintaining provenance and source attribution. The preprocessing module 104 may generate metadata descriptions for all preprocessed data elements, providing detailed information about data sources, preprocessing operations applied, and quality metrics that can be used by subsequent processing components. The preprocessing module 104 ensures that the generated pre-processed data maintains semantic coherence and technical accuracy while being optimized for efficient processing by a vectorization module (as discussed in proceeding paragraphs).

The system 100 further comprises a vectorization module 106 operatively coupled to the preprocessing module 104 and configured to transform the pre-processed data into numerical vector representations using domain-specific embedding models trained on telecom equipment data. Herein, the vectorization module 106 implements convolutional neural networks for image feature extraction and transformer-based encoders for text vectorization. The vectorization module 106 serves as the core transformation component that converts diverse data types into unified numerical representations suitable for machine learning analysis and similarity computation. The vectorization module 106 implements advanced neural network architectures specifically optimized for telecommunications domain data, ensuring that the resulting vector representations capture the semantic and technical characteristics relevant to field service operations. The vectorization module 106 utilizes domain-specific embedding models that have been trained on large datasets of telecommunications equipment images, technical documentation, and field service records to optimize the accuracy and relevance of vector representations. The vectorization module 106 generates high-dimensional numerical vectors that preserve the semantic relationships and technical similarities between different data elements while enabling efficient computational processing and similarity matching.

In present embodiments, the vectorization module 106 implements convolutional neural networks for image feature extraction from field equipment photographs received through the data acquisition module 102. The convolutional neural networks employed by the vectorization module 106 are specifically designed to recognize telecommunications equipment types, configurations, and conditions with high accuracy. The vectorization module 106 utilizes multiple layers of convolutional operations, pooling functions, and activation functions to extract hierarchical features from equipment images, progressing from low-level visual features such as edges and textures to high-level semantic features such as equipment types and installation configurations. The vectorization module 106 implements transfer learning techniques that leverage pre-trained computer vision models and fine-tune them on telecommunications-specific datasets to achieve optimal performance for equipment recognition tasks. The vectorization module 106 generates dense vector representations that encode visual characteristics of field equipment in a format suitable for similarity matching and contextual retrieval operations.

The vectorization module 106 also implements transformer-based encoders for text vectorization of technician reports, job descriptions, and technical documentation received through the data acquisition module 102. The transformer-based encoders utilized by the vectorization module 106 employ attention mechanisms that can capture long-range dependencies and contextual relationships within technical text, enabling accurate semantic understanding of complex telecommunications procedures and problem descriptions. The vectorization module 106 utilizes pre-trained language models that have been fine-tuned on telecommunications-specific text corpora to ensure accurate representation of domain-specific terminology, technical concepts, and procedural knowledge. The vectorization module 106 implements specialized tokenization and encoding techniques that preserve the technical precision of telecommunications terminology while generating vector representations that capture semantic similarity between related concepts and procedures. The vectorization module 106 produces text feature vectors that enable the system 100 to understand and match textual descriptions based on semantic meaning rather than simple keyword matching.

In one or more embodiments, the vectorization module 106 includes specialized components for processing historical job completion records, transforming structured and semi-structured data into vector representations that capture the relationships between job characteristics, procedural steps, and outcomes. The vectorization module 106 may implement multi-modal fusion techniques that can combine vector representations from different data types into unified representations that preserve the relationships between textual descriptions, visual information, and historical context. The vectorization module 106 may also utilize dimensionality optimization techniques to ensure that vector representations are computationally efficient while maintaining sufficient information content for accurate similarity matching and retrieval operations. The vectorization module 106 may further implement quality assessment mechanisms that evaluate the accuracy and consistency of generated vector representations, providing feedback for continuous improvement of the embedding models. The vectorization module 106 generates normalized vector representations that enable consistent similarity computation and ranking across different data types and content domains.

The system 100 further comprises a contextual retrieval module 108 operatively coupled to the vectorization module 106 and configured to retrieve contextually relevant historical data from a vector database 120 by computing similarity metrics between current job vectors and stored job completion vectors. The contextual retrieval module 108 implements information retrieval capabilities that can identify and rank historical field service records based on their relevance to current job situations. The contextual retrieval module 108 utilizes the numerical vector representations generated by the vectorization module 106 to perform efficient similarity searches across large collections of historical job completion data. The contextual retrieval module 108 implements multiple similarity metrics including cosine similarity, Euclidean distance, and domain-specific similarity measures to identify the most relevant historical cases for each current job situation. The contextual retrieval module 108 maintains the vector database 120 that stores vector representations of historical job completion records along with associated metadata and outcome information. The contextual retrieval module 108 also provides ranked lists of relevant historical cases that can inform decision-making and recommendation generation for current field operations.

In present embodiments, the contextual retrieval module 108 implements advanced indexing and search algorithms that enable real-time retrieval of relevant information from large-scale historical databases. The contextual retrieval module 108 utilizes approximate nearest neighbor search algorithms such as locality-sensitive hashing and hierarchical navigable small world graphs to achieve efficient similarity search performance even with large vector databases. The contextual retrieval module 108 also implements multi-criteria retrieval that can consider various factors including job type, equipment category, problem description similarity, and procedural complexity when identifying relevant historical cases. The contextual retrieval module 108 may include temporal weighting mechanisms that can prioritize more recent historical cases while still considering older cases that may contain valuable procedural knowledge or rare problem scenarios. The contextual retrieval module 108 may further implement contextual filtering that can restrict retrieval results based on specific criteria such as equipment type, location, technician skill level, or organizational policies.

The contextual retrieval module 108 maintains detailed retrieval metrics and performance statistics that enable continuous optimization of similarity thresholds and ranking algorithms. The contextual retrieval module 108 implements relevance feedback mechanisms that can learn from technician interactions and outcome assessments to improve the accuracy of future retrieval operations. The contextual retrieval module 108 provides detailed explanation capabilities that can indicate why specific historical cases were selected as relevant, enabling technicians to understand the basis for retrieved recommendations. The contextual retrieval module 108 may also generate contextual summaries that highlight the key similarities and differences between current job situations and retrieved historical cases, facilitating informed decision-making by field technicians.

The system 100 further comprises a response generation module 110 operatively coupled to the contextual retrieval module 108 and configured to process the numerical vector representations and the retrieved contextual data, using an evolutionary algorithm engine 114, to generate structured job summaries and real-time field recommendations. The response generation module 110 serves as the intelligent decision-making component that synthesizes information from multiple sources to produce actionable guidance for field technicians. The response generation module 110 integrates the numerical vector representations from the vectorization module 106 with the contextually relevant historical data from the contextual retrieval module 108 to generate analysis and recommendations. The response generation module 110 implements advanced natural language generation capabilities that can produce clear, technical accurate, and actionable job summaries and recommendations in formats suitable for field technician use. The response generation module 110 utilizes the evolutionary algorithm engine 114 to continuously optimize its decision-making strategies based on performance feedback and outcome assessments. The response generation module 110 generates structured outputs that include comprehensive job summaries, step-by-step procedural recommendations, required inventory specifications, and estimated completion parameters.

In present embodiments, the response generation module 110 implements intelligent synthesis capabilities that can combine information from current job data with insights from relevant historical cases to generate recommendations that are both context-appropriate and informed by organizational experience. The response generation module 110 utilizes large language models and specialized natural language generation techniques to produce job summaries that are clear, comprehensive, and tailored to the specific needs of telecommunications field operations. The response generation module 110 implements real-time recommendation generation that can provide immediate guidance to field technicians based on current job conditions and retrieved contextual information. The response generation module 110 also includes confidence assessment mechanisms that evaluate the reliability of generated recommendations and provide uncertainty indicators where appropriate. The response generation module 110 generates structured outputs in multiple formats including text summaries, procedural checklists, visual guidance, and integration with existing field service management systems.

The response generation module 110 may implement adaptive content generation that can adjust the detail level, technical complexity, and format of recommendations based on technician experience level, job complexity, and organizational preferences. The response generation module 110 utilizes the evolutionary algorithm engine 114 to evolve and optimize its recommendation generation strategies through continuous learning from field operation outcomes and technician feedback. The response generation module 110 also includes quality assurance mechanisms that validate the technical accuracy and completeness of generated recommendations before delivery to field technicians. The response generation module 110 further implements real-time collaboration capabilities that enable technicians to request clarification, provide feedback, or request additional information during job execution.

Figure 2:
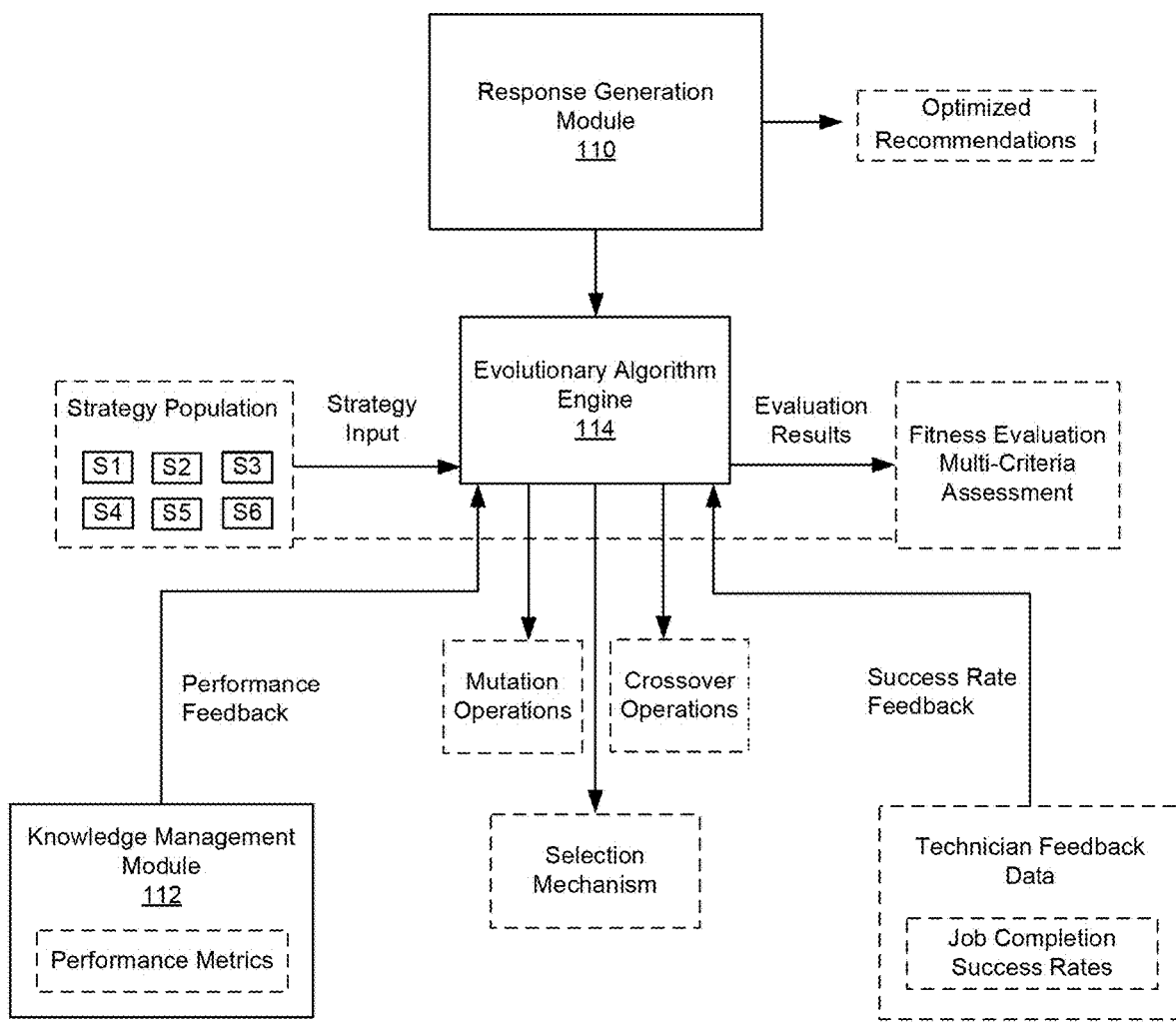
FIG. 2 is a detailed architecture diagram illustrating integration of an evolutionary algorithm engine with a response generation module, including performance metrics feedback loop and knowledge management module interactions, of the system of FIG. 1, according to certain embodiments of the present disclosure.

Referring to FIG. 2, illustrated is an implementation of the evolutionary algorithm engine 114, showing its integration with the response generation module 110 and its role in optimizing decision-making strategies (optimized recommendations). The evolutionary algorithm engine 114 implements biological-inspired optimization techniques including mutation, crossover, and selection operations to continuously improve the performance of the system 100. The evolutionary algorithm engine 114 maintains a population of decision-making strategies (strategy population) represented as computational structures that can be evolved and optimized based on performance metrics and feedback from field operations. The evolutionary algorithm engine 114 applies mutation operations that introduce controlled variations in decision-making strategies to explore new approaches and prevent convergence to suboptimal solutions. The evolutionary algorithm engine 114 implements crossover operations that combine successful elements from different strategies to create new hybrid approaches that may perform better than their parent strategies. The evolutionary algorithm engine 114 also utilizes selection mechanisms that preferentially retain and propagate strategies that demonstrate superior performance in real-world field service applications.

The evolutionary algorithm engine 114 evaluates strategy performance using multiple criteria ($S1, S2, \ldots, Sn$) including job completion success rates, technician satisfaction scores, customer satisfaction metrics, completion time efficiency, and accuracy of generated recommendations. The evolutionary algorithm engine 114 implements fitness functions that quantify the quality of decision-making strategies based on objective performance measures and subjective feedback from field technicians and customers. The evolutionary algorithm engine 114 maintains diversity within the strategy population to ensure exploration of the solution space and prevent premature convergence to locally optimal solutions. The evolutionary algorithm engine 114 implements adaptive parameters that adjust mutation rates, crossover probabilities, and selection pressure based on the current state of strategy evolution and performance improvements. The evolutionary algorithm engine 114 provides mechanisms for incorporating domain knowledge and expert guidance into the evolution process while maintaining the autonomous optimization capabilities.

In an embodiment of the present disclosure, as illustrated in FIGS. 1 and 2, the system 100 further comprises a knowledge management module 112 operatively coupled to the response generation module 110 (via the evolutionary algorithm engine 114) and configured to store the structured job summaries, the real-time field recommendations, and technician feedback data in a centralized knowledge base (not shown) for continuous learning and optimization of the system 100. The knowledge management module 112 implements data storage and organization capabilities that maintain a systematic record of all field service activities, recommendations, outcomes, and feedback. The knowledge management module 112 provides a centralized repository that accumulates organizational knowledge and experience from field operations over time. The knowledge management module 112 implements data indexing and search capabilities that enable efficient retrieval of historical information and identification of patterns and trends in field service operations. The knowledge management module 112 maintains data quality and consistency through validation, verification, and normalization procedures that ensure the accuracy and reliability of stored information. The knowledge management module 112 provides interfaces for technicians, managers, and system administrators to access, contribute to, and analyze the accumulated knowledge base.

The knowledge management module 112 implements feedback collection mechanisms that capture both explicit technician evaluations and implicit performance indicators from field operations. The knowledge management module 112 stores detailed outcome assessments including job completion status, resolution effectiveness, customer satisfaction ratings, and any issues or complications encountered during job execution. The knowledge management module 112 maintains associations between recommendations provided by the response generation module 110 and their corresponding outcomes to enable systematic evaluation of recommendation quality and effectiveness. The knowledge management module 112 implements trend analysis capabilities that can identify patterns in field service operations, recurring problems, equipment issues, and procedural improvements over time. The knowledge management module 112 provides analytics and reporting capabilities that enable organizational learning and strategic decision-making based on accumulated field service experience.

Herein, the evolutionary algorithm engine 114 is configured to evaluate system performance metrics from the knowledge management module 112, evolve decision-making strategies through mutation and crossover operations, and optimize action sequences based on job completion success rates and technician feedback data. The evolutionary algorithm engine 114 interfaces with the knowledge management module 112 to access performance data and feedback information that informs the strategy evolution process. The evolutionary algorithm engine 114 implements multi-objective optimization that simultaneously considers multiple performance criteria including efficiency, accuracy, customer satisfaction, and resource utilization. The evolutionary algorithm engine 114 utilizes job completion success rates as primary fitness indicators, incorporating factors such as first-time fix rates, resolution effectiveness, and customer acceptance of completed work. The evolutionary algorithm engine 114 integrates technician feedback data including subjective assessments of recommendation quality, procedural effectiveness, and user experience to guide strategy evolution. The evolutionary algorithm engine 114 also implements temporal analysis that considers both immediate performance outcomes and long-term trends in strategy effectiveness.

The evolutionary algorithm engine 114 applies mutation operations that introduce controlled variations in decision-making strategies, including modifications to recommendation generation logic, priority weighting schemes, and procedural sequencing algorithms. The evolutionary algorithm engine 114 implements crossover operations that combine successful elements from different strategies, enabling the synthesis of hybrid approaches that may outperform individual parent strategies. The evolutionary algorithm engine 114 may utilize selection mechanisms that preferentially retain strategies demonstrating superior performance while maintaining sufficient population diversity to support continued exploration and improvement. The evolutionary algorithm engine 114 may also implement adaptive parameter control that adjusts evolution parameters based on current performance trends and optimization progress. The evolutionary algorithm engine 114 provides real-time strategy optimization that enables continuous improvement of system performance without interrupting ongoing field operations.

In an aspect of the present disclosure, as depicted in FIG. 1, the vectorization module 106 comprises a computer vision processing component (CV) 116 configured to analyze the image data from field equipment photographs using the convolutional neural networks to identify one or more of telecommunications equipment types, equipment conditions, and equipment installation configurations, and generate image feature vectors representing visual characteristics of field equipment. The computer vision processing component 116 implements advanced image analysis capabilities specifically optimized for telecommunications equipment recognition and assessment.

The computer vision processing component 116 utilizes deep convolutional neural network architectures that can extract hierarchical visual features from telecommunications equipment photographs, progressing from basic edge detection and texture analysis to complex equipment recognition and condition assessment. The computer vision processing component 116 may implement multi-scale analysis techniques that can identify equipment characteristics at different levels of detail, from overall equipment type classification to specific component identification and configuration analysis. The computer vision processing component 116 may also employ transfer learning methodologies that leverage pre-trained computer vision models and adapt them to telecommunications-specific equipment recognition tasks through fine-tuning on domain-specific datasets. The computer vision processing component 116 includes specialized preprocessing capabilities that optimize equipment photographs for analysis, including perspective correction, lighting normalization, and noise reduction techniques tailored to field photography conditions. The computer vision processing component 116 generates image feature vectors that encode visual characteristics of field equipment in high-dimensional numerical representations suitable for similarity matching and contextual analysis.

For purposes of the present disclosure, the computer vision processing component 116 implements telecommunications equipment type identification capabilities that can distinguish between different categories of network equipment including routers, switches, optical equipment, power systems, cooling systems, and installation hardware. The computer vision processing component 116 includes equipment condition assessment features that can evaluate the physical state of equipment including signs of wear, damage, corrosion, overheating, or other condition indicators that may affect equipment performance or require maintenance attention. The computer vision processing component 116 may include specialized features for analyzing telecommunications-specific visual elements such as LED status indicators, display screens, label information, cable types and colors, connector configurations, and equipment serial numbers or model identifiers. The computer vision processing component 116 provides equipment installation configuration analysis that can identify cable connections, mounting configurations, ventilation arrangements, and spatial relationships between equipment components that may impact service procedures or troubleshooting approaches.

Further, as depicted in FIG. 1, the vectorization module 106 comprises a natural language processing component (NLP) 118 configured to process the text data from technician reports using the transformer-based encoders to extract semantic meaning from one or more of job descriptions, equipment specifications, and problem descriptions, and generate text feature vectors representing textual content semantics. The natural language processing component 118 implements advanced language understanding capabilities specifically optimized for telecommunications technical documentation and field service communications. The natural language processing component 118 utilizes transformer-based neural network architectures that employ attention mechanisms to capture complex relationships and dependencies within technical text, enabling accurate semantic understanding of telecommunications procedures, problem descriptions, and equipment specifications. The natural language processing component 118 implements domain-specific tokenization and vocabulary management that recognizes telecommunications terminology, equipment model numbers, technical abbreviations, and industry-specific language patterns. The natural language processing component 118 generates high-dimensional text feature vectors that preserve semantic relationships between related concepts while enabling efficient similarity computation and contextual matching.

The natural language processing component 118 implements named entity recognition capabilities that can identify and extract specific telecommunications entities such as equipment types, model numbers, location identifiers, problem categories, and procedural steps from unstructured text inputs. The natural language processing component 118 may include intent classification features that can determine the purpose and context of technician communications, distinguishing between problem reports, procedure documentation, equipment specifications, and other types of technical information. The natural language processing component 118 provides semantic similarity analysis that can identify relationships between different textual descriptions, enabling the system 100 to match similar problems, procedures, or equipment configurations across different service encounters. The natural language processing component 118 may implement text normalization and standardization capabilities that can resolve variations in terminology, spelling, abbreviations, and formatting while preserving semantic meaning and technical accuracy. The natural language processing component 118 generates structured representations of textual content that enable integration with other data modalities and support multimodal analysis and recommendation generation.

For purposes of the present disclosure, the natural language processing component 118 includes specialized processing capabilities for different types of telecommunications technical documentation including job descriptions that describe work to be performed, problem descriptions that detail customer issues or equipment failures, equipment specifications that provide technical details about network components, and procedural documentation that describes service methodologies and best practices. The natural language processing component 118 may implement context-aware processing that can understand technical terms and concepts within their specific telecommunications context, distinguishing between different meanings of terms that may have multiple interpretations in different technical domains. The natural language processing component 118 provides temporal analysis capabilities that can understand procedural sequences, temporal relationships, and causal connections described in technical text. The natural language processing component 118 may also implement quality assessment mechanisms that evaluate the completeness, clarity, and technical accuracy of processed text, providing feedback to improve documentation quality over time.

In an embodiment of the present disclosure, the response generation module 110 is configured to generate the real-time field recommendations comprising at least one of equipment identification results, troubleshooting step sequences, required inventory specifications, and estimated completion time parameters, based on analysis of the numerical vector representations and the retrieved contextual data. The response generation module 110 implements recommendation generation capabilities that address all aspects of field service operations, from initial equipment identification through job completion and documentation. The response generation module 110 integrates information from multiple sources including current job data, historical cases, equipment databases, and procedural knowledge to generate contextually appropriate and technically accurate recommendations. The response generation module 110 may utilize advanced natural language generation techniques to produce clear, actionable recommendations that are tailored to the specific needs and experience level of individual field technicians. The response generation module 110 may also implement real-time processing capabilities that can generate recommendations immediately upon receiving job information, enabling rapid response to field service requirements.

In particular, the response generation module 110 generates equipment identification results that provide detailed information about telecommunications equipment encountered in field operations, including equipment type, model, manufacturer, specifications, and relevant technical characteristics. The response generation module 110 also produces troubleshooting step sequences that provide systematic approaches to diagnosing and resolving equipment problems, based on analysis of current symptoms, historical resolution procedures, and best practice methodologies. The response generation module 110 may also create required inventory specifications that identify parts, tools, and materials needed for job completion, based on analysis of current equipment conditions, planned procedures, and historical inventory usage patterns. The response generation module 110 further generates estimated completion time parameters that provide realistic projections for job duration based on analysis of job complexity, required procedures, technician experience level, and historical completion data for similar tasks.

In an embodiment of the present disclosure, the response generation module 110 is configured to integrate technician feedback data from the knowledge management module 112 into the evolutionary algorithm engine 114 to dynamically adjust recommendation accuracy and continuously improve field service guidance quality. The response generation module 110 implements feedback integration mechanisms that can process both explicit technician evaluations and implicit performance indicators derived from job outcomes and completion metrics. The response generation module 110 utilizes the evolutionary algorithm engine 114 to evolve and optimize recommendation generation strategies based on accumulated feedback and performance data. The response generation module 110 implements continuous learning capabilities that enable real-time adaptation of recommendation quality and relevance based on ongoing field service experiences. The response generation module 110 provides personalized recommendation adaptation that can adjust guidance based on individual technician preferences, experience levels, and performance patterns while maintaining overall system optimization objectives.

The response generation module 110 may implement multi-dimensional feedback analysis that considers various aspects of recommendation quality including technical accuracy, procedural effectiveness, clarity of communication, completeness of information, and practical applicability in field conditions. The response generation module 110 utilizes feedback data to identify patterns in recommendation effectiveness across different types of jobs, equipment categories, problem types, and operational contexts. The response generation module 110 may also implement automated quality assessment mechanisms that can detect potential issues with generated recommendations before delivery to field technicians, based on analysis of historical feedback patterns and quality indicators.

In an embodiment of the present disclosure, the data acquisition module 102 is further configured to receive one or more of audio data from technician voice recordings and video data from field procedure recordings as the multimodal data inputs, and the preprocessing module 104 is configured to convert the audio data and the video data into structured formats compatible with the vectorization module 106. The data acquisition module 102 implements advanced multimodal data capture capabilities to include audio and video content from field operations. The data acquisition module 102 provides interfaces for capturing audio data from technician voice recordings including verbal job descriptions, problem reports, procedural narrations, and communication with customers or team members during field service activities. The data acquisition module 102 also includes capabilities for recording video data from field procedure recordings that document equipment installation procedures, troubleshooting activities, safety protocols, and other visual procedural information that may be valuable for training and knowledge sharing purposes.

The preprocessing module 104 implements audio processing capabilities that can convert voice recordings into structured text representations through automatic speech recognition while preserving important audio characteristics such as speaker identification, emotional tone, and technical terminology usage. The preprocessing module 104 also implements video processing capabilities that can extract keyframes, identify important visual events, and generate textual descriptions of procedural activities captured in video recordings. The preprocessing module 104 may apply temporal synchronization techniques that can align audio and video content with other job data elements to create comprehensive multimodal records of field service activities. The preprocessing module 104 may also implement noise reduction and quality enhancement techniques for audio and video data that optimize content quality for subsequent analysis while preserving important technical information and procedural details. The preprocessing module 104 generates structured metadata for audio and video content that enables efficient indexing, search, and retrieval of specific procedural information or technical discussions captured during field operations.

In an embodiment of the present disclosure, the domain-specific embedding models are trained using machine learning algorithms on at least one of telecommunications equipment images, field service documentation, and historical job completion data to optimize vector representation accuracy for telecommunications field operations. Herein, the domain-specific embedding models implement specialized training methodologies that optimize vector representations for telecommunications-specific content and concepts. The domain-specific embedding models utilize large-scale datasets of telecommunications equipment images that include diverse equipment types, installation configurations, operational conditions, and environmental contexts commonly encountered in field service operations. The domain-specific embedding models leverage historical job completion data including successful resolution procedures, equipment replacement patterns, and outcome assessments to optimize vector representations for predictive accuracy and contextual relevance.

In an aspect of the present disclosure, the contextual retrieval module 108 is configured to implement approximate nearest neighbor search algorithms to identify the contextually relevant historical data from the vector database 120 and rank retrieved results based on similarity score thresholds determined by at least one of job type classification and equipment category matching. The contextual retrieval module 108 implements advanced search algorithms that enable efficient similarity search across large-scale vector databases containing historical field service records. The contextual retrieval module 108 also utilizes approximate nearest neighbor search techniques including locality-sensitive hashing, random projection, and hierarchical navigable small world graphs to achieve real-time search performance even with extensive historical databases. The contextual retrieval module 108 implements intelligent ranking mechanisms that consider multiple factors including vector similarity scores, job type compatibility, equipment category relevance, and temporal proximity when prioritizing retrieved historical cases. The contextual retrieval module 108 provides configurable similarity thresholds that can be adjusted based on job complexity, available historical data, and desired precision versus recall trade-offs for different types of field service situations.

For purposes of the present disclosure, the contextual retrieval module 108 implements job type classification capabilities that categorize field service activities into distinct types such as installation, maintenance, troubleshooting, replacement, and upgrade operations, enabling targeted retrieval of relevant historical precedents for each job category. The contextual retrieval module 108 includes equipment category matching that ensures retrieved historical cases involve similar types of telecommunications equipment, considering factors such as equipment function, manufacturer, technology generation, and installation environment. The contextual retrieval module 108 generates detailed explanation and justification for retrieved cases, enabling technicians to understand the basis for similarity assessments and make informed decisions about applying historical insights to current situations.

Figure 3:
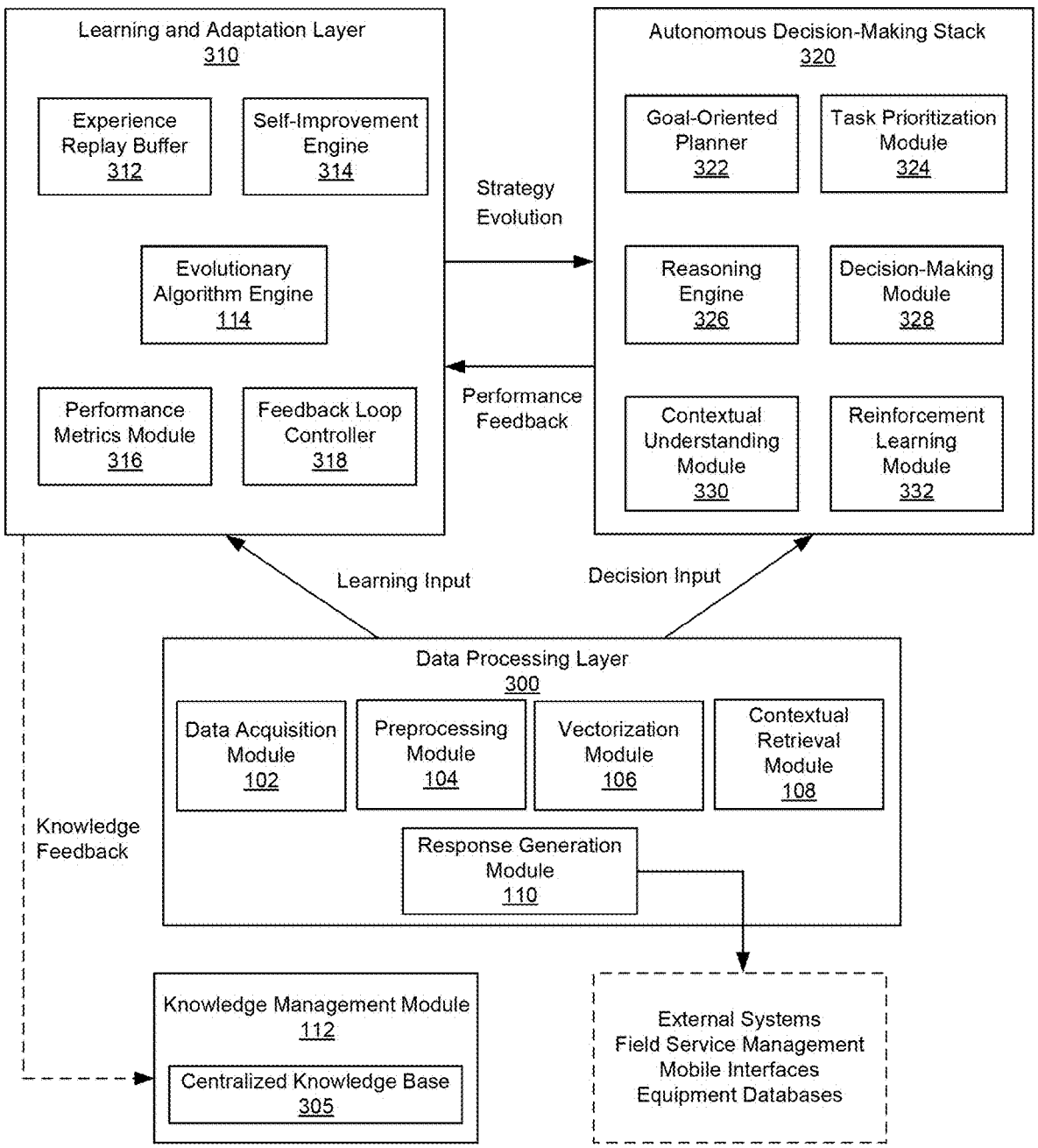
FIG. 3 is a high-level architecture diagram showing learning and adaptation components, autonomous decision-making stack, and their interactions within the system of FIG. 1, according to certain embodiments of the present disclosure.

Referring to FIG. 3, illustrated is a high-level architecture diagram showing the integration of learning and adaptation components with autonomous decision-making capabilities within the system 100. The architecture demonstrates the interplay between various system modules that enable intelligent field service assistance. The architecture illustrates the feedback loops that enable continuous learning from field operations and systematic improvement of system capabilities over time.

Herein, a data processing layer 300 forms the foundational structure of the system and includes the data acquisition module 102, the preprocessing module 104, the vectorization module 106, the contextual retrieval module 108, and the response generation module 110. The data acquisition module 102 is configured to collect multimodal data inputs such as text, images, and historical records from field operations. The preprocessing module 104 normalizes and prepares these inputs for further analysis, thereby ensuring compatibility across diverse data types. The vectorization module 106 transforms the pre-processed data into numerical vector representations using domain-specific embedding models, which facilitates efficient machine learning processing. Further, the contextual retrieval module 108 is adapted to retrieve relevant historical data from the vector database 120 by computing similarity metrics between current job vectors and stored job completion vectors. In parallel, the response generation module 110 synthesizes the processed data along with retrieved contextual information to generate structured job summaries and real-time field recommendations, including that for external systems, field service management, mobile interfaces, equipment databases, etc.

Further, a learning and adaptation layer 310 is implemented, which includes the evolutionary algorithm engine 114 that continuously optimizes system performance through evolution-based optimization techniques (based on learning input from the data processing layer 300). Herein, the evolutionary algorithm engine 114 provides an experience replay buffer 312, a self-improvement engine 314, a performance metrics module 316, and a feedback loop controller 318. Herein, the experience replay buffer 312 is a storage mechanism that retains historical data, including past decisions, actions, and outcomes from field operations. This buffer allows the system to revisit and analyze previous experiences, enabling reinforcement learning algorithms to learn from past successes and failures. By replaying these experiences, the system 100 can refine its decision-making strategies and improve its performance over time. The self-improvement engine 314 utilizes evolutionary algorithms, such as mutation and crossover, to optimize decision-making strategies and action sequences. By continuously analyzing performance data and technician feedback, the engine identifies areas for improvement and implements changes to enhance effectiveness of the system 100 in dynamic field environments. The performance metrics module 316 is responsible for monitoring and evaluating operational effectiveness of the system 100. It tracks key performance indicators (KPIs) such as task completion rates, first-time fix rates, resolution times, and technician satisfaction scores. The feedback loop controller 318 integrates real-time feedback from field technicians and operational outcomes into learning process of the system 100, ensuring it adapts to changing conditions and incorporates user input to refine its recommendations and strategies. By closing the loop between performance evaluation and decision-making, the controller facilitates continuous improvement and alignment with real-world requirements.

Moreover, the present architecture implements an autonomous decision-making stack 320 for goal-oriented planning capabilities that can evolve task sequences and action plans based on contextual information and historical experience (based on decision input from the data processing layer 300). The autonomous decision-making stack 320 comprises a goal-oriented planner 322, a task prioritization module 324, a reasoning engine 326, a decision-making module 328, a contextual understanding module 330, and a reinforcement learning module 332. In this context, these modules synergistically work together to synthesize data inputs, generate actionable insights, and prioritize tasks based on contextual information and historical precedents. Herein, the goal-oriented planner 322 is configured to create structured action plans based on the objectives of field service operations. The task prioritization module 324 organizes and ranks field service tasks according to urgency, complexity, and resource availability to optimize operational efficiency. The reasoning engine 326 is responsible for analyzing data inputs and contextual information to derive logical conclusions and actionable insights. The decision-making module 328 synthesizes the insights generated by the reasoning engine and contextual data to make informed decisions, determining the best course of action for field technicians, such as recommending troubleshooting steps, inventory requirements, or estimated completion times. The contextual understanding module 330 integrates multimodal data inputs to provide an analysis of field situations, while the reinforcement learning module fine-tunes decision-making strategies based on real-time feedback and performance metrics. The reinforcement learning module 332 fine-tune decision-making strategies based on real-time feedback and performance metrics.

In present implementations, the knowledge management module 112 provides a centralized knowledge base 305 for storing structured job summaries, real-time recommendations, and technician feedback (received as knowledge feedback from the learning and adaptation layer 310). Thus, the knowledge management module 112 facilitates continuous learning and optimization by accumulating organizational knowledge and enabling systematic analysis of field service outcomes. The centralized knowledge base 305 maintained by the knowledge management module 112 supports long-term performance improvements and knowledge accumulation across the telecommunications organization.

Figure 4:
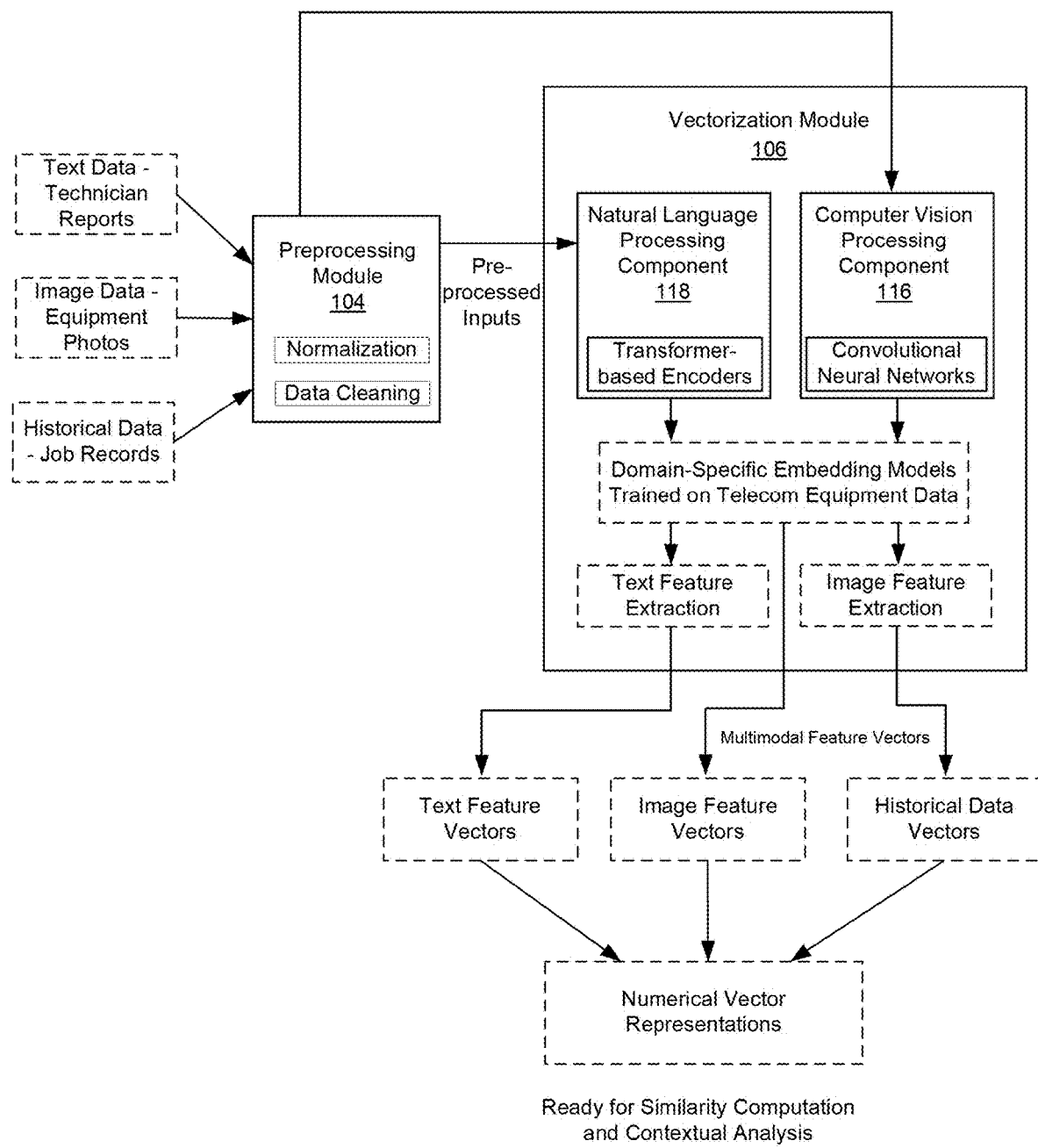
FIG. 4 is a vectorization flow diagram illustrating transformation process from multimodal inputs to numerical vector representations, including convolutional neural network and transformer-based processing paths, in the system of FIG. 1, according to certain embodiments of the present disclosure.

Referring to FIG. 4, illustrated is a vectorization flow diagram that shows the detailed process of transforming multimodal inputs into numerical vector representations. The diagram demonstrates the parallel processing paths for different data types including text vectorization through transformer-based encoders, image vectorization through convolutional neural networks, and historical data vectorization through structured embedding techniques. The vectorization flow includes preprocessing steps that normalize and optimize data for machine learning processing, followed by specialized embedding generation that creates high-dimensional numerical representations suitable for similarity computation and contextual analysis. This vectorization flow also illustrates the integration of domain-specific embedding models that are optimized for telecommunications field service applications, ensuring that vector representations capture the technical nuances and semantic relationships relevant to field operations.

As illustrated in FIG. 4, the multimodal data inputs include text data from technician reports, image data from equipment photos, and historical data from job records, which are processed through the preprocessing module 104. The preprocessing module 104 implements normalization and data cleaning operations to generate preprocessed inputs that are suitable for the vectorization module 106. Within the vectorization module 106, the natural language processing component 118 utilizes transformer-based encoders to process text inputs, while the computer vision processing component 116 employs convolutional neural networks to analyze image data. Both components utilize domain-specific embedding models trained on telecom equipment data to ensure accurate representation of telecommunications-specific concepts and relationships.

The vectorization process generates distinct feature vectors for each data modality through text feature extraction and image feature extraction operations. The text feature vectors capture semantic meaning from technician reports and technical documentation, while the image feature vectors encode visual characteristics of field equipment and installation configurations. The historical data vectors preserve temporal and procedural relationships from previous field service encounters. These multimodal feature vectors are then aggregated into unified numerical vector representations that maintain the semantic coherence across different data types while enabling efficient similarity computation and contextual analysis for subsequent processing by the contextual retrieval module and response generation components.

Figure 5:
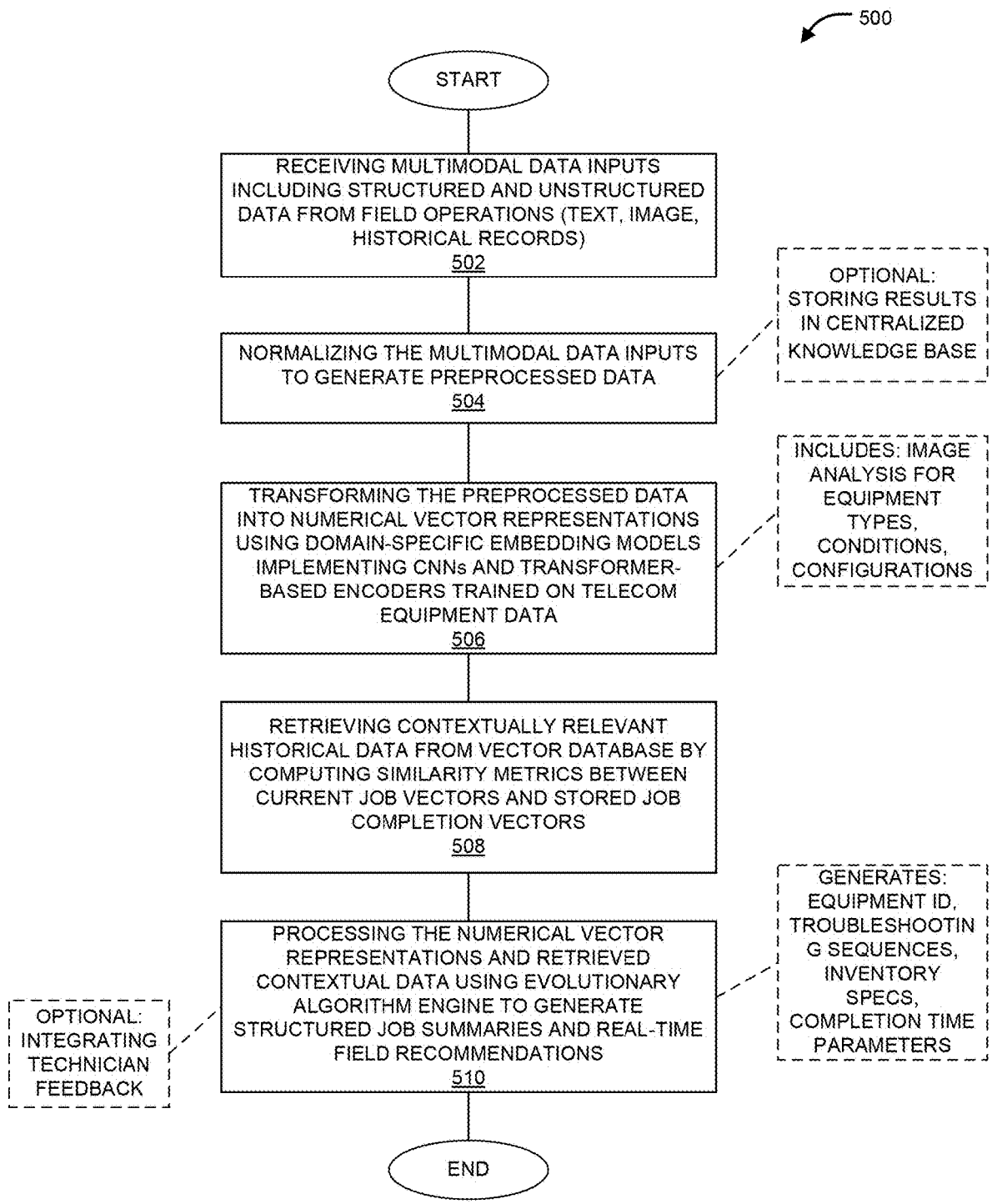
FIG. 5 is a flowchart of a method for providing field service assistance for telecommunications operations, according to certain embodiments of the present disclosure.

Referring now to FIG. 5, illustrated is a flowchart of a method 500 for providing field service assistance for telecommunications operations. The method 500 provides a systematic approach for processing multimodal data inputs from field operations and generating intelligent recommendations through coordinated operation of the system components described above. The method 500 enables automated analysis of diverse field operation data types and generation of structured job summaries and real-time field recommendations through machine learning and evolutionary optimization techniques.

At step 502, the method 500 includes receiving multimodal data inputs including structured and unstructured data from field operations, the multimodal data inputs comprising at least one of text data from technician reports, image data from field equipment photographs, and historical job completion records. The method 500 receives the multimodal data inputs through the data acquisition module 102 as described above, which implements specialized interfaces for handling diverse data types commonly encountered in telecommunications field service operations. This step enables data capture from multiple sources including technician-generated text reports containing job descriptions and problem assessments, field equipment photographs captured during service visits, and historical job completion records stored in organizational databases. The method 500 implements data validation and quality assurance procedures during the receiving step to ensure that the multimodal data inputs are properly formatted and suitable for subsequent processing.

At step 504, the method 500 includes normalizing the multimodal data inputs to generate pre-processed data. The method 500 applies the normalization procedures through the preprocessing module 104 as described above, which implements standardization techniques tailored to telecommunications field service data. This step applies text normalization including tokenization, spell checking, and standardization of technical terminology to ensure consistent representation of textual information. The method 500 implements image preprocessing including resizing, brightness adjustment, and noise reduction to optimize image quality for computer vision analysis. The normalizing process ensures that all data types are converted into formats compatible with subsequent vectorization processing while preserving semantic content and technical accuracy.

At step 506, the method 500 includes transforming the pre-processed data into numerical vector representations using domain-specific embedding models trained on telecom equipment data, wherein transforming the pre-processed data implements convolutional neural networks for image feature extraction and transformer-based encoders for text vectorization. The method 500 performs the transformation through the vectorization module 106 as described above, which employs specialized neural network architectures optimized for telecommunications domain data. This step applies convolutional neural networks to extract hierarchical visual features from field equipment photographs, enabling automated equipment recognition and condition assessment. The method 500 utilizes transformer-based encoders to process textual content and extract semantic meaning from job descriptions, equipment specifications, and problem descriptions. The transforming process generates high-dimensional numerical vectors that preserve semantic relationships and technical characteristics while enabling similarity computation and contextual analysis.

At step 508, the method 500 includes retrieving contextually relevant historical data from the vector database 120 by computing similarity metrics between current job vectors and stored job completion vectors. The method 500 performs the retrieval through the contextual retrieval module 108 as described above, which implements similarity search algorithms to identify relevant historical precedents. This step computes multiple similarity metrics including cosine similarity and Euclidean distance to quantify relationships between current job situations and historical field service records. The method 500 applies ranking algorithms that prioritize retrieved results based on relevance scores and contextual factors such as job type and equipment category. The retrieving process enables to leverage organizational knowledge and experience from previous field operations to inform current decision-making and recommendation generation.

At step 510, the method 500 includes processing the numerical vector representations and the retrieved contextual data, using an evolutionary algorithm engine, to generate structured job summaries and real-time field recommendations. The method 500 performs the processing through the response generation module 110 and the evolutionary algorithm engine 114 as described above, which integrate information from multiple sources to produce actionable guidance. This step synthesizes current job data with relevant historical information to generate job summaries that document all relevant aspects of field service situations. The method 500 applies evolutionary optimization techniques to continuously improve recommendation generation strategies based on performance feedback and outcome assessments. Such processing produces real-time field recommendations that provide immediate guidance to field technicians for equipment identification, troubleshooting procedures, inventory requirements, and completion time estimation.

In some embodiments, the method 500 further comprises storing the structured job summaries, the real-time field recommendations, and technician feedback data in a centralized knowledge base for continuous learning and optimization. The method 500 implements the storage through the knowledge management module 112 as described above, which maintains a repository of field service information and outcomes. The storing enables accumulation of organizational knowledge that improves system performance over time through systematic learning from field operations. The method 500 involves capturing both explicit technician evaluations and implicit performance indicators to support continuous optimization of recommendation quality and system effectiveness.

In some embodiments, transforming the pre-processed data comprises analyzing the image data from field equipment photographs using the convolutional neural networks to identify one or more of telecommunications equipment types, equipment conditions, and equipment installation configurations, and generating image feature vectors representing visual characteristics of field equipment. The method 500 implements such analysis through the computer vision processing component 116 as described above, which applies specialized image analysis techniques for telecommunications equipment recognition. This analysis enables automated equipment identification and condition assessment that reduces manual inspection requirements and improves accuracy of equipment-related recommendations. The method 500 generates standardized image feature vectors that enable consistent representation and comparison of visual equipment characteristics across different field service encounters.

In some embodiments, processing the numerical vector representations and the retrieved contextual data comprises generating the real-time field recommendations comprising at least one of equipment identification results, troubleshooting step sequences, required inventory specifications, and estimated completion time parameters, based on analysis of the numerical vector representations and the retrieved contextual data. The method 500 implements recommendation generation that addresses different aspects of field service operations from initial assessment through job completion. Such generations provide field technicians with actionable guidance that combines current job analysis with insights from relevant historical cases to optimize service delivery and resolution effectiveness. The method 500 produces recommendations in structured formats that integrate with existing field service management systems and mobile device interfaces used by technicians.

In some embodiments, the method 500 further comprises integrating technician feedback data from the centralized knowledge base into the evolutionary algorithm engine 114 to dynamically adjust recommendation accuracy and continuously improve field service guidance quality. The method 500 implements feedback integration mechanisms that process both explicit technician evaluations and implicit performance indicators derived from job outcomes. This integration enables real-time adaptation of recommendation generation strategies based on accumulated field service experience and changing operational conditions. The method 500 applies evolutionary optimization techniques to evolve decision-making approaches that demonstrate superior performance in real-world field service applications while maintaining diversity in strategy populations to support continued improvement.

The system 100 and the method 500, as described in the present disclosure, for field service assistance for telecommunications operations integrate multimodal data processing capabilities with machine learning techniques to address fundamental challenges in telecommunications field service including manual documentation requirements, lack of contextual intelligence, and limited organizational learning from field operations. The system 100 employs domain-specific embedding models trained on telecom equipment data to ensure accurate representation of telecommunications-specific concepts and relationships, while the evolutionary algorithm engine enables continuous optimization of decision-making strategies without requiring manual system reconfiguration. The combination of the vectorization module implementing convolutional neural networks for image feature extraction and transformer-based encoders for text vectorization with the contextual retrieval module computing similarity metrics between current job vectors and stored job completion vectors provides multimodal analysis capabilities that exceed conventional field service support systems.

The system 100 and the method 500 provide advantages over existing approaches through its integrated processing of multimodal data inputs including structured and unstructured data from field operations, enabling comprehensive situation analysis that captures textual, visual, and historical information in unified numerical vector representations. The system 100 enables automated processing of diverse field operation data types that traditionally require manual analysis and interpretation. The system 100 implements self-improving decision strategies through the evolutionary algorithm engine 114 that can adapt to changing field conditions and emerging telecommunications technologies without requiring manual reprogramming. The system 100 provides contextual intelligence through similarity matching and historical case retrieval that leverages organizational knowledge and experience. The system 100 delivers real-time field assistance that can provide immediate guidance and recommendations to field technicians, reducing decision-making time and improving job completion efficiency. The system 100 provides scalable processing capabilities that can handle large volumes of field service data while maintaining real-time response performance. The system 100 also enables personalized assistance that can adapt to individual technician preferences and experience levels while maintaining overall system optimization objectives. The system 100 implements robust quality assurance mechanisms that ensure the accuracy and reliability of generated recommendations and job summaries. The system 100 further provides transparent operation that enables technicians to understand the basis for recommendations and contribute to system improvement through feedback and evaluation.

The system 100 and the method 500 described herein can be implemented using various computing hardware configurations and distributed system architectures. The system 100 can be deployed as a cloud-based service that provides field service assistance capabilities to multiple telecommunications organizations through secure network connections. The system 100 can be implemented as an on-premises solution that operates within the telecommunications organization's existing information technology infrastructure. The system 100 can be deployed as a hybrid architecture that combines cloud-based processing capabilities with local data storage and processing components. The system 100 supports mobile device integration that enables field technicians to access system capabilities through smartphones, tablets, and other portable computing devices commonly used in field operations.

The system 100 can be implemented across various deployment environments including public cloud platforms, private cloud infrastructures, edge computing environments, and containerized microservices architectures. The system 100 supports integration with existing enterprise systems including customer relationship management platforms, enterprise resource planning systems, inventory management databases, network management systems, and field service management applications. The system 100 can operate within virtualized environments utilizing virtual machines, container orchestration platforms, and serverless computing frameworks to provide scalable processing capabilities. The system 100 also supports various network connectivity options including wireless networks, cellular data connections, satellite communications, and secure virtual private network connections to accommodate diverse operational environments. The system 100 can further be configured to operate in offline mode with periodic synchronization capabilities, enabling field technicians to access core functionality even in areas with limited network connectivity, while maintaining data consistency and security requirements across distributed deployments.

The system 100 can be implemented using a computing device which includes a central processing unit (CPU) that performs the processes described herein. The process data and instructions may be stored in memory. These processes and instructions may also be stored on a storage medium such as a hard drive or portable storage medium or may be stored remotely. The system 100 is not limited by the form of the computer-readable media on which the instructions are stored. For example, the instructions may be stored on compact discs, digital versatile discs, in flash memory, random access memory, read only memory, programmable read only memory, erasable programmable read only memory, electrically erasable programmable read only memory, hard disk or any other information processing device with which the computing device communicates, such as a server or computer.

The system 100 may be provided as a utility application, background daemon, or component of an operating system, or combination thereof, executing in conjunction with the CPU and an operating system such as Microsoft Windows, UNIX, Solaris, LINUX, Apple MAC-OS and other systems known to those skilled in the art. The hardware elements in order to achieve the computing device may be realized by various circuitry elements, known to those skilled in the art. For example, the CPU may be a processor from Intel Corporation of America or Advanced Micro Devices of America, or may be other processor types that would be recognized by one of ordinary skill in the art. Alternatively, the CPU may be implemented on a field programmable gate array, application specific integrated circuit, programmable logic device or using discrete logic circuits, as one of ordinary skill in the art would recognize. Further, the CPU may be implemented as multiple processors cooperatively working in parallel to perform the instructions of the inventive processes described above.

The computing device implementing the system 100 also includes a network controller, such as an Intel Ethernet network interface card from Intel Corporation of America, for interfacing with a network. As can be appreciated, the network can be a public network, such as the Internet, or a private network such as a local area network or wide area network, or any combination thereof and can also include public switched telephone network or integrated services digital network sub-networks. The network can also be wired, such as an Ethernet network, or can be wireless such as a cellular network including enhanced data rates for global evolution, third generation, fourth generation and fifth generation wireless cellular systems. The wireless network can also be WiFi, Bluetooth, or any other wireless form of communication that is known.

The functions and features described herein may also be executed by various distributed components of a system. For example, one or more processors may execute these system functions, wherein the processors are distributed across multiple components communicating in a network. The distributed components may include one or more client and server machines, which may share processing, in addition to various human interface and communication devices. The network may be a private network, such as a local area network or wide area network, or be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

While specific embodiments of the invention have been described, it should be understood that various modifications and alternatives may be implemented without departing from the spirit and scope of the invention. The described system and method components can be implemented using different hardware configurations, software architectures, and deployment models while maintaining the core functionality and advantages of the disclosed approach. The principles and techniques described herein can be adapted to other field service domains beyond telecommunications, including utilities, energy, transportation, and other industries that require complex field operations with multimodal data analysis and intelligent decision support.

Numerous modifications and variations of the present disclosure are possible in light of the above teachings. It is therefore to be understood that within the scope of the appended claims, the invention may be practiced otherwise than as specifically described herein.

The invention claimed is:

1. A system for field service assistance for telecommunications operations, the system comprising one or more memory devices storing instructions that, when executed by one or more processors, cause the one or more processors to perform operations comprising:
receiving multimodal data inputs including structured and unstructured data from field operations, the multimodal data inputs comprising at least one of text data from technician reports, image data from field equipment photographs, and historical job completion records, and further receiving one or more of audio data from technician voice recordings and video data from field procedure recordings as the multimodal data inputs;
normalizing the multimodal data inputs to generate pre-processed data;
transforming the pre-processed data into numerical vector representations using domain-specific embedding models trained on telecom equipment data, wherein transforming the pre-processed data comprises implementing convolutional neural networks for image feature extraction and transformer-based encoders for text vectorization;
retrieving contextually relevant historical data from a vector database by computing similarity metrics between current job vectors and stored job completion vectors; and
processing the numerical vector representations and the retrieved contextual data, using an evolutionary algorithm engine, to generate structured job summaries and real-time field recommendations,
wherein the normalizing the multimodal data inputs comprises converting the audio data and the video data into structured formats compatible with the transforming of the pre-processed data.

2. The system of claim 1, wherein the one or more processors are configured to perform operations comprising:
storing the structured job summaries, the real-time field recommendations, and technician feedback data in a centralized knowledge base for continuous learning and optimization of the system.

3. The system of claim 2, wherein the evolutionary algorithm engine is configured to evaluate system performance metrics, evolve decision-making strategies through mutation and crossover operations, and optimize action sequences based on job completion success rates and technician feedback data.

4. The system of claim 1, wherein the one or more processors are configured to perform operations comprising:
analyzing the image data from field equipment photographs using the convolutional neural networks to identify one or more of telecommunications equipment types, equipment conditions, and equipment installation configurations, and generating image feature vectors representing visual characteristics of field equipment.

5. The system of claim 1, wherein the one or more processors are configured to perform operations comprising:
processing the text data from technician reports using the transformer-based encoders to extract semantic meaning from one or more of job descriptions, equipment specifications, and problem descriptions, and generating text feature vectors representing textual content semantics.

6. The system of claim 1, wherein the one or more processors are configured to perform operations comprising:
generating the real-time field recommendations comprising at least one of equipment identification results, troubleshooting step sequences, required inventory specifications, and estimated completion time parameters, based on analysis of the numerical vector representations and the retrieved contextual data.

7. The system of claim 2, wherein the one or more processors are configured to perform operations comprising:
integrating technician feedback data into the evolutionary algorithm engine to dynamically adjust recommendation accuracy and continuously improve field service guidance quality.

8. The system of claim 1, wherein the domain-specific embedding models are trained using machine learning algorithms on at least one of telecommunications equipment images, field service documentation, and historical job completion data to optimize vector representation accuracy for telecommunications field operations.

9. The system of claim 1, wherein the one or more processors are configured to perform operations comprising: implementing approximate nearest neighbor search algorithms to identify the contextually relevant historical data from the vector database and ranking retrieved results based on similarity score thresholds determined by at least one of job type classification and equipment category matching.

10. A method for providing field service assistance for telecommunications operations, the method comprising:

receiving multimodal data inputs including structured and unstructured data from field operations, the multimodal data inputs comprising at least one of text data from technician reports, image data from field equipment photographs, and historical job completion records, and further receiving one or more of audio data from technician voice recordings and video data from field procedure recordings as the multimodal data inputs;

normalizing the multimodal data inputs to generate pre-processed data;

transforming the pre-processed data into numerical vector representations using domain-specific embedding models trained on telecom equipment data, wherein transforming the pre-processed data implements convolutional neural networks for image feature extraction and transformer-based encoders for text vectorization;

retrieving contextually relevant historical data from a vector database by computing similarity metrics between current job vectors and stored job completion vectors; and processing the numerical vector representations and the retrieved contextual data, using an evolutionary algorithm engine, to generate structured job summaries and real-time field recommendations, wherein normalizing the multimodal data inputs comprises converting the audio data and the video data into structured formats compatible with the transforming of the pre-processed data.

11. The method of claim 10, further comprising storing the structured job summaries, the real-time field recommendations, and technician feedback data in a centralized knowledge base for continuous learning and optimization.

12. The method of claim 10, wherein transforming the pre-processed data comprises:

analyzing the image data from field equipment photographs using the convolutional neural networks to identify one or more of telecommunications equipment types, equipment conditions, and equipment installation configurations; and generating image feature vectors representing visual characteristics of field equipment.

13. The method of claim 10, wherein processing the numerical vector representations and the retrieved contextual data comprises generating the real-time field recommendations comprising at least one of equipment identification results, troubleshooting step sequences, required inventory specifications, and estimated completion time parameters, based on analysis of the numerical vector representations and the retrieved contextual data.

14. The method of claim 11, further comprising integrating technician feedback data from the centralized knowledge base into the evolutionary algorithm engine to dynamically adjust recommendation accuracy and continuously improve field service guidance quality.

* * * * *